United States Patent [19]

Nagashima

[11] 3,943,665

[45] Mar. 16, 1976

[54] APPARATUS FOR PROFILE GRINDING CLOSED CURVED SURFACE

[75] Inventor: Kazuo Nagashima, Numazu, Japan

[73] Assignee: Toshiba Kikai Kabushiki Kaisha, Tokyo, Japan

[22] Filed: July 29, 1974

[21] Appl. No.: 492,985

[30] Foreign Application Priority Data
July 31, 1973 Japan.............................. 48-86025
Aug. 16, 1973 Japan.............................. 48-91972

[52] U.S. Cl.......................... 51/101 R; 51/DIG. 32
[51] Int. Cl.²...................... B24B 5/08; B24B 17/00
[58] Field of Search....... 51/101 R, DIG. 32, 281 C, 51/281 R; 82/19; 90/13.9

[56] References Cited
UNITED STATES PATENTS

| | | | |
|---|---|---|---|
| 2,836,936 | 6/1958 | Lovely | 51/DIG. 32 X |
| 3,663,188 | 5/1972 | Hoglund | 51/101 R |
| 3,693,297 | 9/1972 | Cann | 51/DIG. 32 X |
| 3,750,345 | 8/1973 | Kolesar | 51/DIG. 32 X |
| 3,800,473 | 4/1974 | Levesque | 51/101 R X |
| 3,816,996 | 6/1974 | Uhtenwoldt | 51/101 R |
| 3,822,511 | 7/1974 | Hoglund | 51/101 R |
| 3,827,191 | 8/1974 | Crawford | 51/101 R |
| 3,828,481 | 8/1974 | Uhtenwoldt | 51/101 R |

*Primary Examiner*—Al Lawrence Smith
*Assistant Examiner*—Nicholas P. Godici
*Attorney, Agent, or Firm*—Spensley, Horn and Lubitz

[57] ABSTRACT

In an apparatus for profile grinding a closed curved surface such as a trochoidal curved surface of the type wherein the attitude of a worktable which supports a workpiece is profile controlled in accordance with a master profile corresponding to the closed curved surface to be formed in the workpiece, the axis of a grinding wheel is maintained at a fixed position, a mechanical information is generated by the cooperation of a master cam having a peripheral profile corresponding to the profile of the closed curved surface and a master cam normally urged against the peripheral profile, and the attitude of the worktable is controlled in accordance with the mechanical information. Where a grinding wheel having a diameter different from a predetermined value is used, a primary feed calculated by an equation to be described later is applied to the grinding wheel thus enabling to use a grinding wheel of any diameter.

8 Claims, 9 Drawing Figures

APPARATUS FOR PROFILE GRINDING CLOSED CURVED SURFACE

BACKGROUND OF THE INVENTION

This invention relates to a method and apparatus for grinding a trochoidal curved surface comprising the inner curved surface of a rotor housing of a rotary engine, and more particularly to a method and apparatus wherein a worktable supporting a workpiece, for example, a rotor housing, is profile controlled by means of a cam having a profile corresponding to the trochoidal curved surface to be worked and a solid roller cooperating with the cam, the rotation and revolution necessary for the grinding operation are inparted to the worktable and the workpiece is ground while the axis of the grinding wheel is maintained at a definite position.

Although various methods and apparatus have been proposed to grind a trochoidal curved surface comprising the inner curved surface of a rotor housing of a rotary engine, this invention relates to a method and apparatus of the class wherein a cam having a profile corresponding to the trochoidal curved surface to be work is used, and the attitude of a worktable on which a rotor housing or a workpiece is mounted is controlled by the cooperation of the cam and a roller, whereby to grind the workpiece.

One example of the prior art methods of grinding the workpiece by using a cam will first be described with reference to FIGS. 1 and 2 of the accompanying drawings. As shown in FIG. 2, a downwardly projecting master cam MC provided with an inner master profile M having the same profile as an internal curved surface to be worked and an outer drive profile N formed by an envelope spaced an equal distance in the radial direction from the inner master profile M is formed on the lower surface of a worktable T which supports a rotor housing of a rotary engine, for example, that is a workpiece, and on a stationary portion of the machine, not shown, are rotatably mounted a master roller MR which is urged against the master profile M of the master cam MC, and a drive roller DR which is urged against the drive profile N so as to clamp the master cam MC between it and the master roller MR. When the drive roller DR is driven by driving means, such as an electric motor, not shown, the worktable T is rotated by the rolling contact between the drive profile N and the drive roller DR so that the work piece mounted on the table T is ground by a grinding wheel, not shown, in a manner as will be described later. A secondary cam groove SC is formed on the periphery of the master cam MC to receive a secondary roller SR rotatably supported by the stationary portion so as to control the attitude of the master cam MC. Thus, the table T is rotated while its attitude is being controlled by the cooperation of master cam MC and the rollers such that normal line to the master profile M and passing through a contacting point P between the master roller MR and the master cam MC always alignes with a line OM-OD interconnecting the center of rotation OM of the master roller MR and the center of rotation OD of the drive roller DR. On the other hand, a grinding wheel G is supported above the table T with its axis G' positioned on the line OM-OD and its periphery passed through the contacting point P so as to work the inner surface of the workpiece. In this manner, it is possible to form by grinding operation a curved surface having the same profile as the master profile M. This method requires to use a master cam and a secondary cam and since the accuracies of these cams influence directly the working accuracy, the accuracies of the cams should be extremely high. According to the present day engineering level, machining of cams of such high accuracies is difficult. Especially, it is extremely difficult to finish the master profile M of the master cam MC and the secondary cam groove SC with the desired high accuracies. Further, according to this method, since a rotating torque is imparted to the table T by the rolling contact between the drive roller DR and the master cam MC, in order to impart a large driving torque it is necessary to increase the contact pressure, hence the frictional force between the drive roller DR and the drive profile N. For this reason, the materials for constructing the cam and roller are limited by such physical characteristics as the frictional characteristic, fatigue characteristic, strength, etc. of the materials. In order to decrease the contact pressure it is necessary to increase the size of the cam or roller, or to subject a special material to a special heat treatment or surface treatment. Yet, reliable products are still difficult to obtain. To obviate this difficulty, it has been necessary to use a coupling means that can transmit the driving power from the source of drive to the worktable without relying upon the power transmission system utilizing rolling contact.

Further, although this method is advantageous in that its principle is simple and that even when the diameter of the grinding wheel varies it is still possible to finish an accurately ground profile by merely adjusting the amount of feed of the grinding wheel, as the angular velocity of the worktable varies positively or negatively in accordance with the irregularities of the curved surface to be worked it is impossible to rotate the worktable at a high speed so that the efficiency of the grinding operation is not high.

SUMMARY OF THE INVENTION

Accordingly it is an object of this invention to provide an improved method and apparatus of grinding a trochoidal curved surface enabling to profile control the worktable by using only a cam, the periphery thereof must be finished at a high accuracy for the purpose of improving the working accuracy.

Another object of this invention is to provide an improved method and apparatus for grinding a trochoidal curved surface at a high accuracy and reliability by using an improved motion transmission device between the source of drive and the worktable instead of the rolling contact between the drive roller and the cam.

Still another object of this invention is to provide an improved method and apparatus for grinding a trochoidal curved surface at a high speed and at a high efficiency wherein the moving speed of the grinding point can be maintained at a definite value.

Yet another object of this invention is to provide a novel apparatus for grinding a trochoidal curved surface enabling to use a cam having an advantageous profile from the stand point of engineering and including an improved mechanism for positively driving the worktable.

A further object of this invention is to provide an improved method and apparatus for grinding a closed curved surface at high efficiencies at a uniform grinding speed.

Still further object of this invention is to provide an improved grinding apparatus capable of grinding a closed curved surface such as a trochoidal curved surface with a grinding wheel having a diameter different from a predetermined standard diameter thereby enabling the same grinding wheel to perform coarse and fine grinding operations.

According to one aspect of this invention, there is provided a method of profile grinding a closed curved surface of the type wherein the attitude of a worktable which supports a workpiece is profile controlled in accordance with a master profile corresponding to the closed curved surface to be formed in the workpiece, characterized by the steps of maintaining the axis of a grinding wheel at a fixed position, generating a mechanical information by the cooperation of a master cam having a peripheral profile corresponding to the profile of the closed curved surface and a master cam normally urged against the peripheral profile, and controlling the attitude of the worktable in accordance with the mechanical information.

Where the diameter of the grinding wheel is different from a predetermined standard value a predetermined primary feed calculated in accordance with an equation to be described later is applied to the grinding wheel thereby enabling to use grinding wheels of any diameter.

According to another feature of this invention, there is provided apparatus for profile grinding a trochoidal curved surface comprising a worktable for supporting a workpiece, means for rotating and translating the worktable in a horizontal plane, a shaft for supporting a grinding wheel above the worktable, said shaft having the axis thereof positioned on an axis of symmetry in the curved surface to be worked by the grinding wheel, a pair of master rollers having the same diameter and rotatably supported by the stationary portion of the apparatus at portions symmetrical with respect to the axis of symmetry, a master cam movable in unison with the worktable and provided with two closed surfaces on the outer periphery thereof, said two closed curved surfaces cooperating to define a profile corresponding to the trochoidal curved surface, and means for urging said master rollers respectively against the two closed curved surfaces of the master cam whereby the direction of movement of the workpiece is controlled by the cooperation of the master cam and the master rollers so as to grind the workpiece by the grinding wheel.

According to still another aspect of this invention there is provided a profile modeling grinding apparatus of the class wherein a worktable supporting a workpiece is profile controlled by the cooperation of a master cam formed with a profile on the periphery thereof corresponding to the closed curved surface to be ground and a master roller, and wherein means is provided for imparting a composite motion of rotation and translation required to perform a constant speed grinding operation to said worktable, characterized in that there are provided a cam movable in the vertical direction with respect to the upper surface of the worktable, an intermediate post supported by the ram to be movable in the direction of the primary feed applied to a grinding wheel in the horizontal direction, a vertical supporting shaft, means for supporting the opposite ends of the supporting shaft by the intermediate post, a grinder head supported by the supporting shaft to be swingable thereabout in a plane parallel with the upper surface of the worktable, a grinder shaft extending through the grinder head in parallel with the supporting shaft, said grinding wheel being secured to the grinder shaft, a correction shaft supported by the grinder head, a pair of guide coupling members cooperating with the opposite ends of the correction shaft so as to drive the ends and with fixed shafts rotatably supported by the ram so as to cause the fixed shafts to act as the drive members for the guide coupling members, a correction cam provided with a correction profile on the outer periphery thereof and secured to the worktable and the master cam to rotate therewith, a press roller, means for normally urging the press roller against the correction profile of the correction cam, means for transmitting the angular movements of the press roller to the guide coupling members so as to impart thereto corresponding angular movement, and means for applying a predetermined primary feed to the grinding wheel whereby when a grinding wheel having a diameter different from a predetermined standard diameter is used, the position of the grinder shaft is corrected in accordance with the angular position of the worktable thus grinding a closed curved surface in the workpiece.

In order to have better understanding of the invention a trochoidal curve will be firstly analyzed as follows. A two node epitrochoidal curve usually utilized as the inner contour of the rotor housing of a rotary engine can be expressed by the following equations in which $\theta$ is used as a parameter.

$$\left. \begin{array}{l} X = R\cos\theta + e\cos 3\theta \\ \\ Y = R\sin\theta + e\sin 3\theta \end{array} \right\} \quad (1)$$

where $e$ represents the degree of eccentricity of an eccentric shaft, R the radius of a rotor. Both $e$ and R may be treated as constant values. These equations are well known basic equations for typical rotary engines such as the Wankel engine.

By differentiating equation 1 with respect to $\theta$, we obtain:

$$\left. \begin{array}{l} \frac{dx}{d\theta} = -R\sin\theta - 3e\sin 3\theta \\ \\ \frac{dY}{d\theta} = R\cos\theta + 3e\cos 3\theta \end{array} \right\} \quad (2)$$

By putting $dS = \sqrt{(dx)^2 + (dY)_2}$, we obtain $$\frac{dS}{d\theta} = \sqrt{R^2 + 9e^2 + 6Re\cos 2\theta} \quad (3)$$

And the direction coefficients of the tangent to the trochoidal curve are given by the following equations:

$$\left. \begin{array}{ll} X \text{ Direction:} & \frac{dx}{dS} = \frac{-R\sin\theta - 3e\sin 3\theta}{\sqrt{R^2 + 9e^2 + 6Re\cos 2\theta}} \\ \\ Y \text{ Direction:} & \frac{dY}{dS} = \frac{R\cos\theta + 3e\cos 3\theta}{\sqrt{R^2 + 9e^2 + 6Re\cos 2\theta}} \end{array} \right\} \quad (4)$$

As a result, the inner profile of the rotor housing comprised by an envelope spaced from the trochoidal curve expressed by equations 1 by the apex seal radius A is given by the following equations:

$$X = R\cos\theta + e\cos 3\theta + A \times \frac{R\cos\theta + 3e\cos 3\theta}{\sqrt{R^2 + 9e^2 + 6e\cos 2\theta}}$$
$$Y = R\sin\theta + e\sin 3\theta + A \times \frac{R\sin\theta + 3e\sin 3\theta}{\sqrt{R^2 + 9e^2 + 6Re\cos 2\theta}} \quad (5)$$

Where the curve expressed by equations 5 is to be ground by a grinding wheel having a diameter of $D_G$, the locus of the center of the grinding wheel is given by the following equations.

$$X = R\cos\theta + e\cos 3\theta - \left(\frac{D_G}{2} - A\right) \times \frac{R\cos\theta + 3e\cos 3\theta}{\sqrt{R^2 + 9e^2 + 6Re\cos 2\theta}}$$
$$Y = R\sin\theta + e\sin 3\theta - \left(\frac{D_G}{2} - A\right) \times \frac{R\sin\theta + 3e\sin 3\theta}{\sqrt{R^2 + 9e^2 + 6Re\cos 2\theta}} \quad (6)$$

In other words, so long as the locus of the center of the grinding wheel satisfies equations 6, the grinding wheel will operate to grind a curve expressed by equations 5.

Turning now to the principle of this invention, according to this invention, the center position of the grinding wheel is fixed whereas the worktable on which the rotor housing or a workpiece is mounted is moved and the locus of the center of the grinding wheel with respect to the turntable is caused to satisfy equation 6. As an example, as shown in FIG. 3, the center G' of the grinding wheel G is positioned on the major axis X of the curved surface to be worked and two master rollers A and B are disposed at positions symmetrical with respect to the major axis. The length of the projection upon the major axis X of the distance between the centers of the master rollers A and B and the center of the grinding wheel is denoted by F and the length of the projection upon the minor axis Y of said distance is denoted by E. While the center positions of the master rollers A and B are maintained at fixed positions with respect to the center of the grinding wheel the worktable is rotated while master cams C and D carried by the worktable are maintained in contact with the peripheries of master rollers A and B. Under these conditions, the attitude of the worktable is controlled by the contact condition between the master roller B and the master cam D. According to this invention, by controlling the attitude of the worktable in this manner, the grinding operation is performed while causing the locus of the center of the grinding wheel with respect to the worktable to satisfy equations 6. Accordingly, those which control the attitude of the worktable so as to satisfy equations 6 are the profiles of the master cams C and D. According to this invention, the profiles of the master cams are determined such that the speed of movement of the grinding point will be constant. To this end, the loci of the center positions of the master rollers A and B with respect to the worktable are determined and the profiles of the master cams are determined in accordance with such loci.

A method of making constant the speed of movement of the grinding point is as follows. A dotted line curve shown in FIG. 4 shows the profile of the curve to be worked where the normal to the curve to be worked at the grinding point P, which is assumed to be a definite point, is made to coincide with a straight line interconnecting the grinding point P and the center G' of the grinding wheel. However, so long as the position of the center of the grinding wheel relative to the worktable satisfies equations 6, the position of the grinding point P is not required to be always definite and a slight variation can assure grinding of the workpiece to have a substantially correct contour. For this reason, in accordance with this invention, the curve to be worked is rotated by an angle $\phi$ relative to the center of the grinding wheel as shown by a solid line in FIG. 4. Accordingly, the grinding point P is shifted to point Q. Angle $\phi$ represents a compensation angle required for maintaining the speed of movement of the grinding point at a constant value and can be determined as follows.

Since the profile of the curved surface to be ground is given by equations 5, a series of points of the desired number are set on the curved surface. For example, in equations 5, if $\theta$ is incremented by one degree a series of points of the number of 360 will be obtained, whereas if $\theta$ is incremented by 0.5° a series of points of the number of 720 will be obtained.

Denoting the seriese of points thus obtained by $(X_1, Y_1), (X_2, Y_2), \ldots (X_{n-1}, Y_{n-1}), (X_n, Y_n)$ then the distance between points $(X_{m-1}, Y_{m-1})$ and $(X_m, Y_m)$ would be expressed by $$Sm = \sqrt{(X_m - X_{m-1})^2 + (Y_m - Y_{m-1})^2} \quad (7)$$

When the number $n$ of the serieses of points is selected to be sufficiently large enough to assure high working accuracies it is possible to consider that the distance Sm is substantially equal to the peripheral length of the curved surface to be worked between a point $(X_{m-1}, Y_{m-1})$ and a point $(X_m, Y_m)$. Thus, by calculating an equation $$S = \sum_{k=1}^{m} Sk \quad (8)$$

and by putting $X_o = X_n$ and $Y_o = Y_n$, the result represents an approximate value of the total peripheral length of the curved line to be worked. The angle of rotation of the worktable which is proportional to the distance on the curved line to be worked from a point $X_o, Y_o) \equiv (X_n, Y_n)$ on the major axis of the curved surface to be worked is expressed by $$\phi = \frac{2\pi}{s} \times \sum_{k=1}^{M} \sqrt{(X_k - X_{k-1})^2 + (Y_k - Y_{k-1})^2} \text{ (radian)}$$
Or
$$\phi = \frac{360}{s} \times \sum_{k=1}^{m} \sqrt{(X_k - X_{k-1})^2 + (Y_k - Y_{k-1})^2} \text{ (degree)} \quad 9$$

where $(X_k, Y_k)$ represents the coordinates of one point $k$ selected on the trochoidal curved surface to be ground which is divided into $m$ sections, $(X_{k-1}, Y_{k-1})$ the coordinates of a point immediately preceding said one point $k$, and $S$ the total length of grinding path around the trochoidal curved surface.

The total length S can be calculated according to an equation $$S = \sum_{k=1}^{m} \sqrt{(X_k - X_{k-1})^2 + (Y_k - Y_{k-1})^2}$$

The orientation angle $\phi_o$ of the normal to the curved line to be worked can be calculated by the following equation $$\phi_o = -\frac{1}{\frac{dy}{dx}} = \tan^{-1}\left(\frac{R\sin\theta + 3e\sin 3\theta}{R\cos\theta + 3e\cos 3\theta}\right) \quad (10)$$

Accordingly, the correction angle $\phi$ necessary to make constant the speed of movement of the grinding point is calculated by $$\phi = \phi_o - \Phi \quad (11)$$

In this invention, the factors that control the attitude of the worktable so that the locus of the center of the grinding wheel maintained at a definite position described on the worktable satisfy equation 6 are two master rollers A and B and two master cams C and D, and the factors that control the attitude of the worktable such that the speed of movement of the grinding point is maintained at a constant value by rotating the worktable about the center of the grinding wheel as shown in FIG. 4 are also the two master rollers A and B and the two master cams C and D. The loci to be described on the worktable by the centers $O_A$ and $O_B$ of two master rollers A and B which are maintained at definite positions with respect to the center of the grinding wheel as shown in FIG. 3 are determined by the following equations:

$$\left.\begin{aligned}
X_a &= R\cos\theta + e\cos 3\theta - \\
&\left(\frac{D_G}{2} - A\right)\left(\frac{R\cos\theta + 3e\cos 3\theta}{\sqrt{R^2 + 9e^2 + 6Re\cos 2\theta}}\right) + \\
&F_a\cos\Phi - E_a\sin\Phi \\
Y_a &= R\sin\theta + e\sin 3\theta - \\
&\left(\frac{D_G}{2} - A\right)\left(\frac{R\sin\theta + 3e\sin 3\theta}{\sqrt{R^2 + 9e^2 + 6Re\cos 2\theta}}\right) + \\
&F_a\sin\Phi + E_a\cos\Phi
\end{aligned}\right\} 12A$$

$$\left.\begin{aligned}
X_b &= R\cos\theta + e\cos 3\theta - \\
&\left(\frac{D_G}{A} - A\right)\left(\frac{R\cos\theta + 3e\cos 3\theta}{\sqrt{R^2 + 9e^2 + 6Re\cos 2\theta}}\right) + \\
&F_b\cos\Phi + E_b\sin\Phi \\
Y_b &= R\sin\theta + e\sin 3\theta - \\
&\left(\frac{D_G}{2} - A\right)\left(\frac{R\sin\theta + 3e\sin 3\theta}{\sqrt{R^2 + 9e^2 + 6Re\cos 2\theta}}\right) + \\
&F_b\sin\Phi - E_b\cos\Phi
\end{aligned}\right\} 12B$$

Consequently, the profiles of two master cams C and D that engage two master rollers a and B, respectively, can be formed by moving a tool having a diameter equal to that of the master roller along a closed curve obtained by equations 12. The profile of the master cam comprises two curved surfaces which are symmetrical with respect to said axis of symmetry (in the case of FIG. 3, the major axis X) so that when the master cam is divided into two parts as will be described later it is possible to manufacture two cams by the same working operation.

The invention further contemplates the improvement of the method just described according to which even when the diameter of the grinder varies correctly ground profile may be assured by merely applying a primary feed to the grinder. The principle of such improvement is as follows. For the sake of description, a rectangular coordinate system (x-y) is used wherein the origin O corresponds to the center of rotation of a standard grinding wheel having a standard diameter $D_G$ (see equations 6) at the time of finishing the grinding operation, the x-axis extends in a direction perpendicular to a line interconnecting the centers of two master rollers, that is in the direction of feeding of the grinding wheel and the y-axis extends in a direction perpendicular to the x-axis.

In the prior art method and apparatus described hereinabove wherein the direction of the normal through the grinding point is definite, the grinding point P is always located on the x-axis as shown in FIG. 5 and the normal through the grinding point coincides with the x-axis, the center Qo of a grinding wheel To is expressed by definite coordinates $$Qo\left\{\frac{1}{2}(D_G - D). O\right\}$$

where $D_G$ represents the diameter of the standard grinding wheel. As a result, by fixing the axis of the grinding wheel after moving it by a distance $\frac{1}{2}(D_G - D)$ which is equal to the primary feed quantity along the x-axis, a desired curve H to be worked can be obtained.

In the fundamental system of this invention, the orientation of the normal is varied. In this case, as shown in FIG. 6 the grinding point P departs from the x-axis. The angle between the x-axis and a line $\overline{OP}$ normal to the grinding point P corresponds to said correction angle $\phi$ which varies in the positive or negative direction as the curve H to be worked varies. Actual calculation made on the rotor housing of a commercial rotary engine shows that the correction angle $\phi$ varies between +15° and −15°, although this range varies depending upon the constants of the engine. In FIG. 6, T represents a grinding wheel having the standard diameter (the actual diameter of the grinding wheel is $D_G$), H the curve to be worked, and H' an imaginary curve spaced inwardly from the curve H by a distance equal to one half of the diameter D of a grinding wheel having any diameter. Accordingly, in order to obtain the correct curve H to be worked, it is necessary to position the axis of the grinding wheel having any diameter on the imaginary curve H'. Thus, although it is possible to select the position of the axis of the grinding wheel of any diameter at any one of numerous points, as the position of the imaginary curve H' varies with the change in the correction angle $\phi$, such position is limited because it is necessary to make simple the construction of a mechanism which is used to move the axis of the grinding wheel of any diameter always along the imaginary line H'.

Some examples of the methods of moving the axis of the grinding wheel of any diameter along the imaginary curve H' will be described hereunder.

EXAMPLE 1

A method of positioning the axis of the grinding wheel of any diameter on the normal to the grinding point in a case where a standard grinding wheel is used.

The grinding point $P_A$ of the grinding wheel $T_A$ of any diameter coincides with said grinding point P and the axis of the grinding wheel $T_A$ lies on a circle about the origin O and having a radius of $(D_G - D)$ and on a straight line $\overline{P_A O}$. Accordingly, the coordinates of said axis are expressed by $Q_A$ [½$(D_G-D)$ cos $\phi$, ½$(D_G-D)$ sin $\phi$]

EXAMPLE 2

A method wherein the axis of the grinding wheel of any diameter is positioned along the x-axis.

Assume that the axis of a grinding wheel $T_B$ of any diameter is positioned at a point $Q_B$ along the x-axis and that $P_B$ represents its grinding point. Denoting the crossing point of straight lines $\overline{OP}$ and $\overline{Q_B P_B}$ by $G_1$, where the difference between the diameter $D_G$ of the grinding wheel T of the standard diameter and the diameter D of the grinding wheel $T_B$ of any diameter is small $GP_A = GP_B$. Under these conditions $GP_B$ becomes equal to the radius of curvature P of the curve H to be worked and point $G_1$ represents the center of curvature. Then, the coordinates of the point $Q_B$ can be approximately expressed by $$Q_B \left[ \frac{1}{2} (D_G-D) \frac{1}{\cos \phi} \cdot 0 \right]$$

This causes an error of the ground profile which is expressed by $$\epsilon B \approx \sqrt{\left\{ (\rho - \tfrac{1}{2} D_G) \cos \phi - \frac{D_G - D}{2 \cos \phi} \right\}^2 + (\rho - \tfrac{1}{2} D_G)^2 \sin^2 \phi} + \tfrac{1}{2} D - \rho$$

However, where the error $\epsilon B$ was calculated for the rotor housing of a commercial rotary engine when ½ $(D_G-D) = 6$ mm, an error of $|\epsilon B| \leq 0.02$ mm was obtained, showing that sufficient accuracy can be obtained even when the point $Q_B$ is positioned at a point of said coordinates.

The x-axis coordinate may be modified as $$\tfrac{1}{2} (D_G - D) \frac{1}{\cos \phi} = \tfrac{1}{2}(D_G - D) - \tfrac{1}{2}(D_G - D) \frac{1 - \cos \phi}{\cos \phi}$$

$$= \tfrac{1}{2}(D_G - D) - \Delta B$$

where $$\Delta B = \frac{1}{2} (D_G - D) \frac{1 - \cos \phi}{\cos \phi}$$

For this reason, it is possible to provide grinding apparatus capable of using a grinding wheel of any diameter by providing a mechanism which moves the axis of the grinding wheel by the amount of primary feeding $(D_G - D)$ in the same manner as in said case wherein the normal is fixed thereby automatically providing the correction $\Delta B$ along the x-axis.

EXAMPLE 3

A method wherein the axis of the grinding wheel of any diameter is positioned on a straight line $x = \tfrac{1}{2} (D_G - D)$ which is parallel with the y-axis.

When the axis of the grinding wheel $T_c$ of any diameter is positioned at the crossing point $Q_c$ between the straight line $x = \tfrac{1}{2} (D_G - D)$ parallel with the y-axis and the imaginary curve H', the grinding point assumes a point $P_c$. Then, in the same manner as in Example 2, the crossing point between straight lines $\overline{OP}$ and $\overline{Q_c P_c}$ will be the point $G_1$ which is the center of curvature and the radius of curvature will be $G_1 PA = G_1 P_c = \rho$. Under these conditions, the coordinates of the point $Q_c$ will be expressed approximately by $$Q_c \left[ \frac{1}{2}(D_G-D) \cdot \frac{1}{2}(D_G-D) \frac{1 - \cos \phi}{\sin \phi} \right]$$

and the error $\epsilon C$ of the ground profile is expressed by $$\epsilon C = \frac{1}{8} \frac{(D_G - D)^2}{\rho - \tfrac{1}{2} D_G} \left( \frac{1 - \cos \phi}{\sin \phi} \right)^2$$

When this error was calculated for the rotor housing of a commercial rotary engine, an extremely small error of only one-fourth of the profile error $\epsilon B$ of Example 2 was obtained.

Putting now $$\Delta C = \tfrac{1}{2}(D_G - D) \frac{1 - \cos \phi}{\sin \phi}$$

the coordinates of the axis of the grinding wheel $T_c$ of any diameter is expressed by $$Q_c [\tfrac{1}{2}(D_G-D), \Delta C]$$

In the same manner as in said case where the normal is fixed, it is possible to provide grinding apparatus capable of using a grinding wheel of any diameter by using a mechanism which moves the axis of the grinding wheel by a distance equal to the amount of the primary feed and automatically provides the desired correction $\Delta C$ in the direction of the y-axis.

While three examples of the method of moving the axis of the grinding wheel of any diameter along the imaginary curve H' were described a concrete method of automatically providing the desired correction will be described later.

BRIEF DESCRIPTION OF THE DRAWINGS

Further objects and advantages of the invention will be more fully understood from the following detailed description taken in conjunction with the accompanying drawings in which.

DESCRIPTION OF THE PREFERRED EMBODIMENTS

Figure 1:
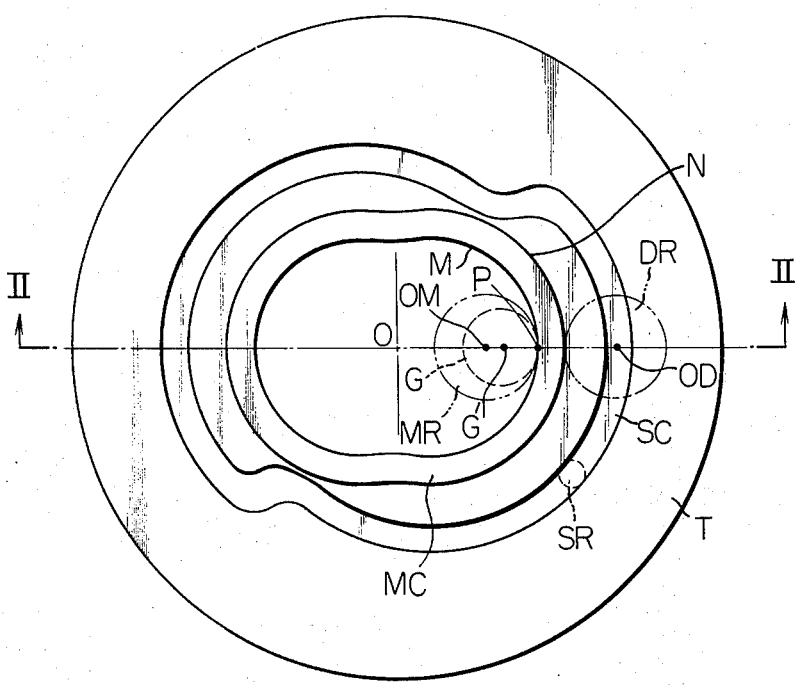
FIG. 1 is a diagrammatic plan view of a prior art apparatus for grinding a trochoidal curved surface.
Figure 2:
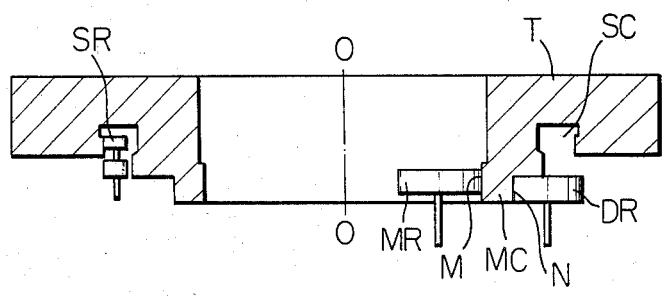
FIG. 2 is a sectional view of the apparatus shown in FIG. 1 taken along a line II—II.
Figure 3:
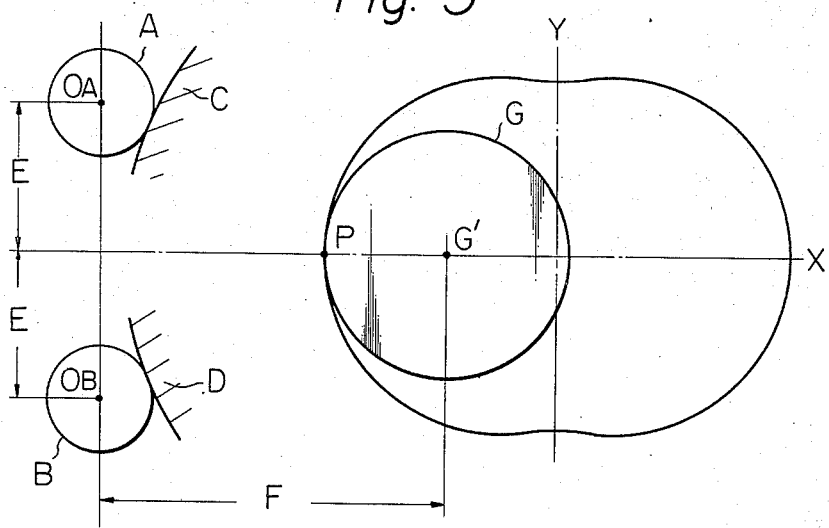
FIGS. 3 to 6 are diagrams to explain the theory of this invention.
Figure 4:
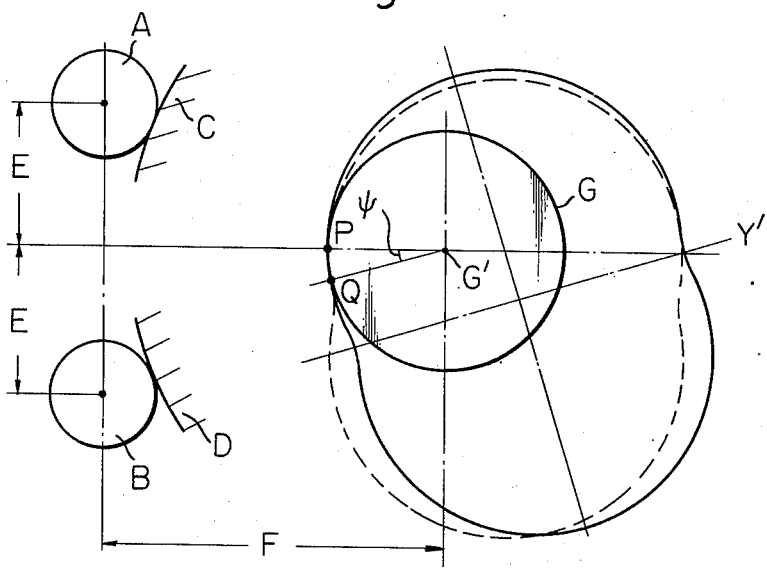
Figure 5:
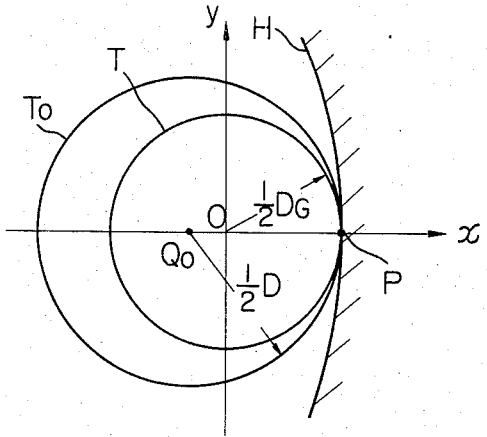
Figure 6:
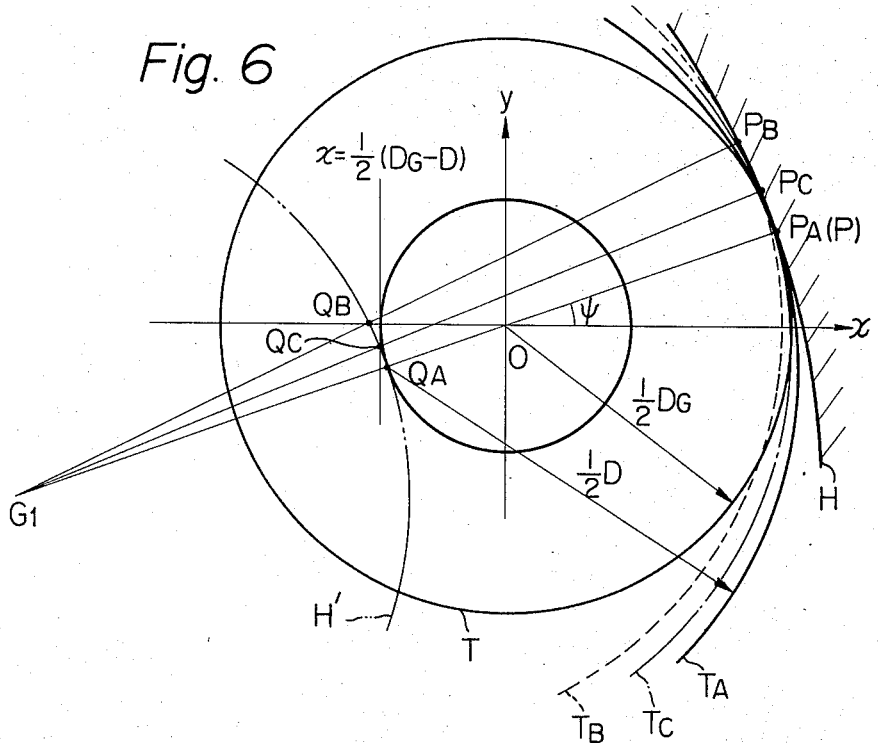
Figure 7:
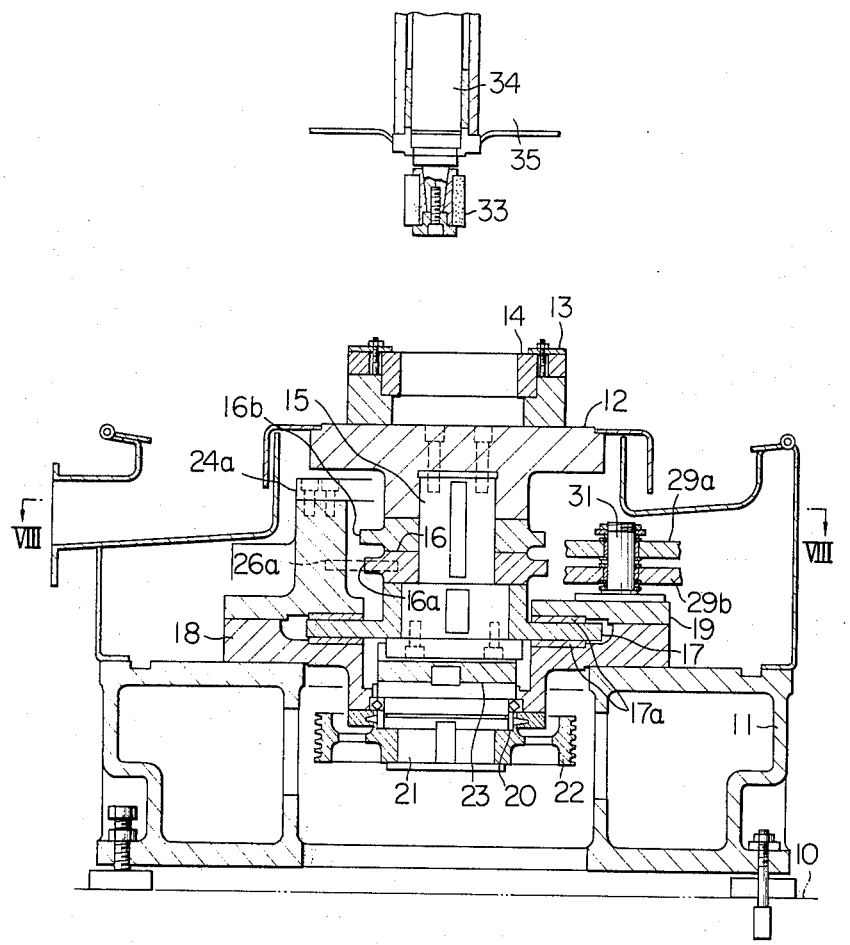
FIG. 7 is a vertical sectional view of one embodiment of the apparatus for grinding a trochoidal curved surface embodying the invention and taken along a line VII—VII shown in FIG. 8.
Figure 8:
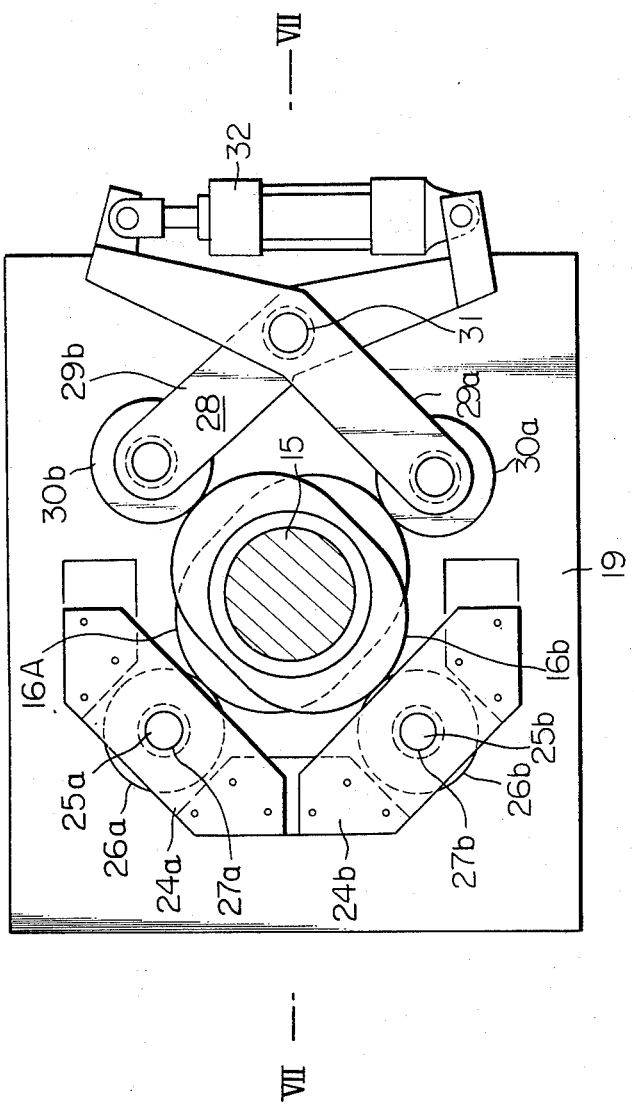
FIG. 8 shows a horizontal sectional view of the apparatus shown in FIG. 7 taken along a line VIII—VIII and FIG. 9 is an exploded perspective view of a modified embodiment of this invention.

Referring now to the accompanying drawings, a preferred embodiment shown in FIGS. 7 and 8 comprises a bed 11 mounted on a base 10, a worktable 12 in the form of a circular disc, and a fixture 13 mounted on the worktable 12. A workpiece 14, for example, the rotor housing of a rotary engine is mounted on the upper surface of the worktable 12 by means of the fixture 13. A master cam 16 and a thrust disc 17 are secured to a spindle 15 in concentric relation with the worktable 12, the spindle projecting downwardly from the worktable 12. As shown, the master cam 16 comprises upper and lower portions for providing a peripheral profile including two closed curved surfaces 16a and 16b as has been described in connection with FIG. 4. When the master cam is divided into the upper and lower portions as shown in FIG. 7, the machining of the closed curved surfaces 16a and 16b is faciliated. The thrust disc 17 is sandwiched between a stationary plate 18 secured to the upper surface of the bed 11 and a upper plate 19 and the upper and lower surfaces of the thrust disc 17 are supported by static pressure bearing plates 17a so that the worktable can freely rotate and translate in a horizontal plane.

A drive shaft 21 is rotatably journalled in the stationary plate 18 by means of a bearing 20. The drive shaft 21 carries a pulley 22 which is driven at a low speed by a V belt and a driving motor, not shown. An Oldam's coupling 23 is interposed between drive shaft 21 and spindle 15 thus positively transmitting the torque from the drive shaft 21 which rotates at the fixed position to the spindle 15 which is rotated at the same speed as the drive shaft 21 while translating.

As shown in FIG. 8, a pair of symmetrical brackets 24a and 24b are secured to the upper portion of the upper plate 19, and shafts 25a and 25b, respectively rotatably carrying master rollers 26a and 26b through bearings 27a, and 27b, respectively, are disposed between the upper plate 19 and the brackets 24a and 24b. The vertical heights of the master rollers 26a and 26b are selected such that the master roller 26a engages the closed curved surface 16a of master cam 16 whereas the master roller 26b engages the closed curved surface 16b of the master cam. Further, the position of the master rollers in the horizontal plane is determined such that when the axis of a grinding wheel 33 is positioned on the major axis of a troidal curve as described hereinbefore, the master rollers will be symmetrical with respect to that major axis. In this example, for the purpose of maintaining the two closed surfaces 16a and 16b on the periphery of the master cam 16 always in contact with the two master rollers 26a and 26b, a press mechanism 28 is provided above the upper plate 19. The press mechanism 28 comprises a pair of arms 29a and 29b, pivotally connected together by a pivot pin 31 at their centers, press rollers 30a and 30b mounted on the inner ends of the arms 29 a and 29b and an operating cylinder 32 connected between the outer ends of the arms. When pressurized fluid, compressed air for example, is admitted into the operating cylinder 32, the press rollers 30a and 30b are urged against the master cam 16 with pressures having components for urging the master cam 16 against master rollers 26a and 26b whereby the master cam 16 is maintained always in contact with the master rollers 26a and 26b.

The grinding wheel 33 is fixed to the shaft 34 of a grinder head 35 positioned above the worktable 12. Since a grinding head of any construction can be used the detail will not be described herein.

As the drive shaft 21 is rotated by starting the driving motor, the torque is transmitted to the spindle 15 via the Oldam's coupling 23. The thrust disc 17 rotating integrally with the spindle 15 is supported by the static pressure bearings 17a to freely rotate in the horizontal plane. Further, as the master cam 16 secured to the spindle 15 rotates while being urged against the master rollers 26a and 26b, the worktable 12 which is integral with the spindle 15 performs rotation and translation in the horizontal plane while its attitude is controlled by the master cam 16. Since the axis of the shaft 33 supporting the grinding wheel 33 is fixed and since the attitude of the worktable 12 is controlled such that the locus of the axis of shaft 34 described on the worktable 12 satisfies equations 6, the grinding wheel 33 will form a curved surface expressed by equations 5 on the workpiece or the rotor housing.

As the master cam utilized in this invention is an outer cam, it is possible to improve the working accuracy of the master cam itself, thus improving the working accuracy of the trochoid grinding apparatus. Moreover, the master cam is formed with two discrete curved surfaces which are symmetrical with each other. In this manner, when the master cam is divided into two parts having closed curved surfaces, it is possible to readily work the master cam. Instead of using a rolling contact as in the prior art method, according to this invention, as a positive motion transmission mechanism is used, it is possible to use an acurate motion transmission mechanism and to improve the reliability of the grinding apparatus.

Figure 9:
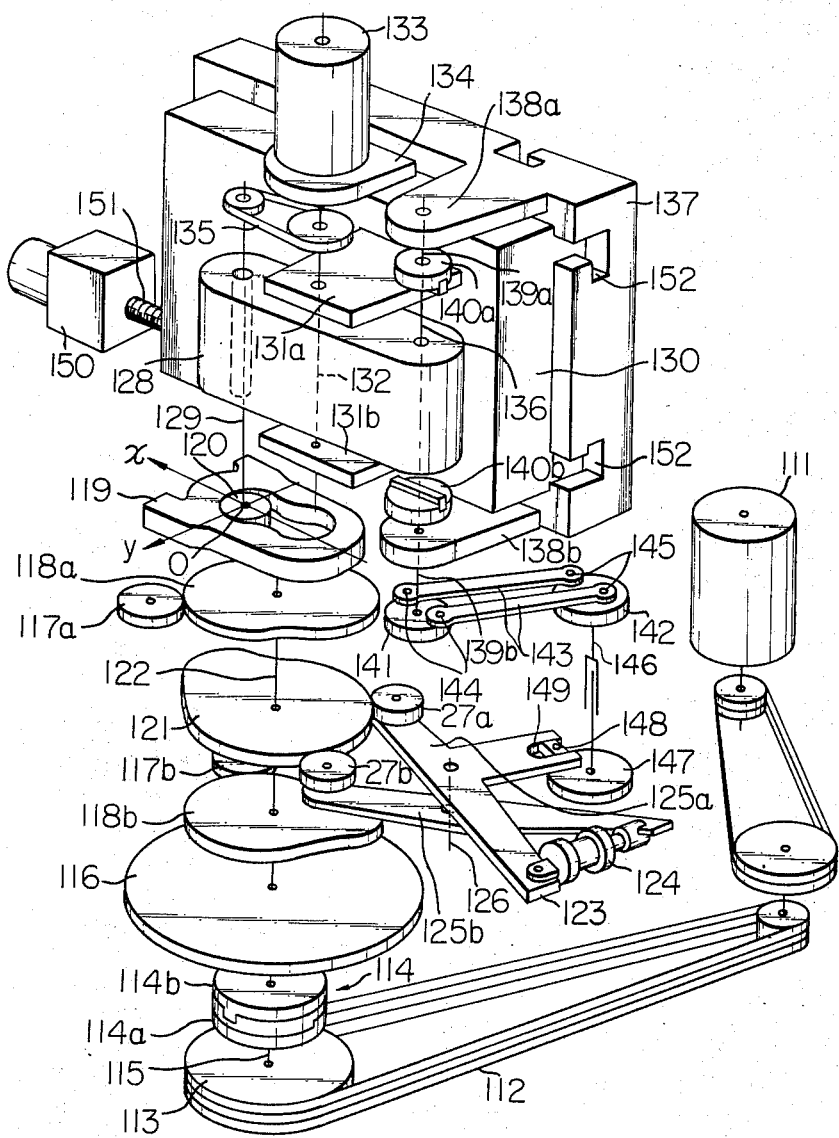

FIG. 9 shows a modified embodiment of this invention in which the principle of Example 3 described above is incorporated. A spindle 122 is driven by a driving motor 111 through a V belt 112, a pulley 113, and an Oldam's coupling 114 including driving and driven members 114a and 114b which accurately transmits the angle of rotation with the axes of rotations movable in the horizontal direction. The shaft 115 carrying the pulley 113 and the drive member 114a of the Oldam's coupling 114 is journalled by a stationary part, not shown. A thrust disc 116 secured to the spindle 122 is supported by static pressure bearings (not shown but similar to bearings 17a shown in FIG. 7) so that the thrust disc 116 can smoothly rotate and translate in the same horizontal plane. Master rollers 117a and 117b rotatably supported by the stationary part are arranged to engage the peripheries of master cams 118a and 118b, respectively, mounted on the spindle 122, the profiles of the master cams cooperating to define a trochoidal curved surface corresponding to the trochoidal curved surface of the rotar housing 119 to be worked. More particularly, the master cams 118 are provided with closed curved surfaces on their peripheries which are formed by moving tools having the same diameter as the master rollers 117 in accordance with equation 12. The curved inner surface of the rotor housing 119 is ground by a grinding wheel 120 having a standard diameter $D_G$. A correction cam 121 provided with a correction profile (to be described later) on its periphery is secured to the spindle 122. The rotor housing 119 to be worked is secured on the top of the spindle by means of a suitable fixture not shown.

A press mechanism 123 is provided for normally maintaining master rollers 117a and 117b in contact with master cams 118a and 118b, respectively. The press mechanism 123 comprises an operating cylinder 124 which rotates arms 125a and 125b about a stationary pivot pin 126 thus urging rollers 127a and 127b carried by arms 125a and 125b respectively against the periphery of the correction cam 121. By the action of these rollers 127a and 127b, the spindle 122 and various members carried thereby is applied with a force acting in the horizontal direction so that the master cams and the master rollers are maintained always in contact with each other.

With the construction described above, since the spindle 122 is imparted with the driving torque through the Oldam's coupling 114 and is displaced laterally by the engagements of the master rollers 117a, 117b, and master cams 118a, 118b, the rotor housing 119 undergoes rotation and translation while restraining the grinding wheel 120 such that it will describe the desired locus of the center as determined by equations 6 and 11.

The grinding wheel 120 is fastened to the lower end of a grinder shaft 129 extending vertically through a grinder head 128. The grinder head is supported by a vertical shaft 132 having opposite ends supported by a pair of brackets 131a and 131b projecting forwardly from an intermediate post 130 so that the grinder head can swing about the supporting shaft 132 which is normal to the x-axis. An electric motor 133 is secured to the intermediate post 130 through a bracket 134 with its axis in vertical alignment with that of the supporting shaft 132. The rotation of the motor 133 is transmitted to the shaft 129 of the grinding wheel via a V belt 135. In this manner, as the motor 133 is in axial alignment with the supporting shaft 132 about which the grinder head swings it is possible to always maintain constant the tension of the V belt irrespective of the swinging motion of the grinder head 128.

A vertical correction shaft 136 extends through an end of the grinder head opposite to the grinding wheel 120 and the opposite ends of correction shaft 136 are connected through guide couplings 140a, 140b, to fixed shafts 139a and 139b, respectively, which are rotatably supported by brackets 138a and 138b projecting forwardly from a ram 137. The correction shaft 136 is constructed such that its axis will come into alignment with the axes of the fixed shafts 139a and 139b when the grinding operation by a grinding wheel of the standard diameter is completed. Further, the fixed shafts 139a, 139b and the supporting shaft 132 are arranged relatively such that their axes are contained in a vertical plane containing the x-axis. Further, the axes of the grinding wheel shaft 129, supporting shaft 132 and correction shaft 136 are arranged in a common horizontal line.

To the lower end of the fixed shaft 139b is secured a circular disc 141 which is connected to a similar circular disc 142 through a pair of parallel levers 143 and connecting pins 144 and 145 so that two circular discs 141 and 142 undergo the same circular displacements. The disc 142 is connected to the upper end of a spline shaft 146 with its lower end connected to a disc 147 provided with a follower 148 received in a recess 149 provided for arm 125a. Accordingly, as the arm 125a is rotated, the guide couplings 140a and 140b are rotated by the same angle as the arm 125a through disc 142, levers 143, disc 141 and fixed shaft 139b.

The intermediate post 130 is constructed to be slidable with respect to ram 137 in a direction parallel with the x-axis. By turning a threaded shaft 151 by means of a feed control device 150, the intermediate post 130 is moved along horizontal guide grooves 152 provided for ram 137. Although not shown, it should be understood that the ram 37 is slidable in the vertical direction along a column.

The guide couplings 140a and 140b are constructed to be slidable in planes perpendicular to their axes only along straight lines passing through their axes, but not in the directions which are perpendicular to the axes and said straight lines. The guide couplings are constructed such that the directions of sliding movements of the guide couplings vary as the shaft is rotated, but that when the orientation of the grinding point with respect to the axis of the grinding wheel coincides with the direction of the feed, and that in the case in which the correction angle $\phi = 0$, the directions of sliding movements of the guide couplings will coincide with the direction of the feed. The profile of the correction cam is selected such that under these conditions, when a primary feed is applied to the grinder head 128 in the direction of the x-axis, the grinder head 128 will translate in the direction of the feed while being supported by the supporting shaft 132 and the correction shaft 136 whereby the axis of the grinding wheel is displaced in the direction of the x-axis by a distance equal to the amount of the primary feed applied. However, when the orientation of the grinding point with respect to the axis of the grinding wheel does not coincide with the direction of the feed, that is where the correction angle $\phi \neq 0$, the directions of the movements of the guide couplings will be varied by an angle $\alpha$ with respect to the direction of the feed.

Where the grinding operation is performed with grinding wheel 120 having the standard diameter the position of the axis of the shaft 129 supporting the grinding wheel coincides with the origin of the $x - y$ coordinate system when the grinding operation is finished, and the eccentricities of the guide couplings 140a and 140b are zero under these conditions. However, for the purpose of using a grinding wheel of any diameter when a primary feed is imparted to the grinder head 128 so as to displace the shaft 129 by $\Delta$ along the x axis, the eccentricities of the guide couplings. 140a, 140b become $\Delta$ so that the correction shaft 136 is moved approximately $\Delta \cdot \tan \alpha$ in the direction of the y-axis when the guide couplings are rotated by the angle $\alpha$. As a consequence, the grinder head 128 rotates about the supporting shaft 132 thereby displacing the shaft 129 in the negative direction along the y-axis by a distance proportional to $\Delta \cdot \tan \alpha$.

Although the value of the x-coordinate of the axis of the shaft 129 is varied by the rotational displacement of the grinder head 128, where the distance between shafts 129 and 132 is made large, such variation can be neglected from the stand point of the working accuracy. That is the value of the x-coordinate can be considered constant.

The outer profile of the correction cam for varying the value of the y-coordinate of the shaft 129 of the grinding wheel will now be described. As described hereinabove, the amount of correction to be made in the direction of the y-axis is expressed by $$\Delta C = \frac{1}{2} (D_G - D) \frac{1 - \cos \phi}{\sin \phi}$$

where $\frac{1}{2} (D_G - D)$ represents the amount of the primary feed which can be given as the degree of eccentricities of the guide couplings. Thus, it will be clear that the angle $\alpha$ of the rotational displacements of the guide couplings should satisfy the following relation:

$$\tan \alpha = K \frac{1 - \cos \phi}{\sin \phi}$$

where $K$ represents a proportionality constant determined by the ratio of the distance between shafts 129 and 132 to the distance between the supporting shaft 132 and the correction shaft 136, the ratio of the distance between the pivot pin 126 of the arm 125a and the center of the press roller 127a to the distance between the pivot pin 126 and the recess 149, and the ratio of the distance between the pivot pin 126 and the recess to the distance between the center of the follower 148 and the axis of the spline shaft 146. The constant K also represents the ratio of the angular displacement of the arm 125a to that of the guide couplings. $\phi$ represents the correction angle given by equation 11 and corresponds to a variable given by the trochoidal curve. Accordingly, when the trochoidal curve is determined, $\phi$ is given and then $\alpha$. When the position of the press roller 27a is determined so as to obtain $\alpha$ of the desired value, it is possible to calculate the peripheral profile of the correction cam 121 corresponding thereto. If the value of the proportionality constant is not correct the profile of the correction cam 121 would not be a smooth single closed curve, and in certain cases, would be multiple closed cruves or contain polygonal lines. Accordingly, it is necessary to determine the profile by trial and error method.

The apparatus shown in FIG. 9 for grinding trochoidal curved surfaces operates as follows:

When electric motor 111 is energized it drives drive shaft 115 at a constant speed through V belt 112. The shaft 115 drives the spindle 122 through the Oldam's coupling 114. However, due to the master profiles of the master cams 118a, 118b, the spindle 122 undergoes a composite motion of rotational and translational motions so that the inner curved surface of the rotor housing to be worked will be ground to form a trochoidal curved surface by profile modeling the master cams. At the same time, the correction cam 121 secured to the spindle 122 undergoes the same motion. Since press rollers 27a and 27b are always held in contact with the periphery of the correction cam 121, arms 125a and 125b are swung about stationary pin 126. The swinging motion of the arm 125a causes the spline shaft 146 to swing about its axis through recess 149, follower 148 and disc 147, and the swinging motion of the spline shaft 146 is converted into the swinging motions of the guide couplings 140a and 140b.

Where final finishing grinding operation is performed with grinding wheel 120 having the standard diameter, the degrees of eccentricities of the guide couplings 140a, 140b are zero so that the correction shaft 136 will be reciprocated at a definite position. As a consequence, the grinder head 128 will be fixed at a definite position and the shaft 129 and the grinding wheel 120 will be rotated at definite positions, thus performing the desired grinding operation upon the rotor housing 119.

Now a case wherein a grinding wheel having a diameter different from the standard diameter is used will be described as follow. In this case, the feed control device 150 is operated to apply a primary feed equal to one half of the difference in the standard diameter and the diameter of the grinding wheel used so as to move the grinder head 128 along the x-axis. Then, the degrees of eccentricities of the guide couplings 40a, 40b are varied by the same amount. Under these conditions, the swinging motion of the arm 125a is transmitted to the guide couplings 140a and 140b via spline shaft 146 and the swinging motions of the guide couplings cause the correction shaft 136 to reciprocate in the lateral direction (in the direction of the y-axis). This causes the grinder head 128 to swing about the supporting shaft 32 thus reciprocating the shaft 129 and the grinding wheel 120 supported thereby in the lateral direction. As a cosequence, the shaft 129 is imparted with the desired correction movement expressed by $$\Delta c = \frac{1}{2} (D_G - D) \frac{1 - \cos \phi}{\sin \phi}$$

in the direction of the y-axis, said correction movement corresponding to the resultant of the primary feed $\frac{1}{2} (D_G - D)$ and the movement $$\frac{1 - \cos \phi}{\sin \phi}$$

imparted by the profile of the correction cam 121. Thus, the grinding wheel 120 performs the desired grinding operation upon the rotor housing 119.

Above description concerns the method of correcting the position of the axis of the grinding wheel described in Example 3. Examples 1 and 2 will now be described. The correcting mechanism described in Example 1 can be obtained by fixing the supporting shaft 132 for the grinder head 128 at the origin and by arranging the shaft 129 for supporting the grinding wheel and the correction shaft 136 to be concentric. Thus, where the standard grinding wheel is used, the shaft 129, the supporting shaft 132 and the correction shaft 136 coincide each other on the origin O. Although this correcting mechanism is advantageous in that, theoretically, the error of the grinding profile is zero, the mechanism is complicated because the axes of various shafts must coincide each other. Further, this method has a defect that the amount of the correction movement of the axis of the grinding wheel is large.

Where a grinding wheel of the standard diameter is used, the correcting mechanism described in Example 2 can be attained by positioning the shaft 129 at the origin, supporting shaft 132 on a definite point along the y-axis, and the correction shaft 136 on a definite point other than the y-axis and having the same y-coordinate as the supporting shaft 132. More particularly, in addition to the mechanism of Example 3 there is provided means for converting the displacement of the correction shaft 136 in the direction of y-axis into the displacement of the shaft 129 in the direction of x-axis. When compared with other examples, this system is advantageous in that the amount of the correction movement is small, so that it is suitable for high speed, high efficiency grinding operations. However, the correction residue is large.

Since in accordance with this invention a worktable supporting a workpiece is profile controlled by the coorporation of a master roller and a master cam, it is possible to grind at a uniform speed, thus improving the speed and efficiency of the grinding operation. Further, where a grinding wheel of any diameter is used, the position of the axis of the grinding wheel can be automatically corrected by merely applying a primary feed equal to one half of the difference in the diameters of the standard grinding wheel and any grinding wheel thus making it possible to use grind wheels of any diameters. This eliminates the trouble of maintaining the diameter of the grinding wheel always in a definite permissible range and hence enable to perform rough grinding as well as fine finishing grinding with the same grinding wheel.

Although the invention has been described in connection with the grinding operation of a trochoidal curved surface it will be clear that the cam controlled profile grinding operation of this invention is also applicable to other curved surfaces than the trochoidal curved surface, such as the profile of the cam ring of a vane pump. In such a case, the trochoidal curved line expressed by equation 1 is replaced by a curve to be ground and similar calculations are made until the locus of the coordinates of the center of the grinding wheel as expressed by equation 6 is obtained. By denoting the coordinates of the center of the grinding wheel having the standard diameter by Xo and Yo, the loci described on the worktable by the centers of two master rollers can be determined by the following equation:

$$X = X_o + F\cos\phi \mp E \sin\phi$$

$$Y = Y_o + F\sin\phi \pm E \cos\phi$$

In this manner, the profile of the master cam can be determined in the same manner as in the case of the trochoidal curved surface. Also, the profile of the correction cam may be determined in the same manner as in the case of the trochoidal curved surface. By merely applying a predetermined primary feed to a grinding wheel of any diameter, the axis of the grinding wheel is automatically corrected thereby assuring accurately ground profiles.

I claim:

1. In a profile modeling grinding apparatus of the class wherein a worktable supporting a workpiece is profile controlled by the cooperation of a master cam formed with a profile on the periphery thereof corresponding to the closed curved surface to be ground and a master roller, and wherein means is provided for imparting a composite motion of rotation and translation required to perform a constant speed grinding operation to said worktable, the improvement which comprises a ram movable in the vertical direction with respect to the upper surface of said worktable, an intermediate post supported by said ram to be movable in the direction of the primary feed which is applied to a grinding wheel in the horizontal direction, a vertical supporting shaft, means for supporting the opposite ends of said supporting shaft by said intermediate post, a grinder head supported by said supporting shaft to be swingable thereabout in a plane parallel with the upper surface of said worktable, a grinder shaft extending through said grinder head in parallel with said supporting shaft, said grinding wheel being secured to said grinder shaft, a correction shaft supported by said grinder head, a pair of guide coupling members cooperating with the opposite ends of said correction shaft so as to drive said ends and with fixed shafts rotatably supported by said ram so as to cause said fixed shafts to act as the drive members for said guide coupling members, a correction cam provided with a correction profile on the outer periphery thereof and secured to said worktable and said master cam to rotate therewith, a press roller, means for normally urging said press roller against said correction profile of the correction cam, means for transmitting the angular movement of said press roller to said guide coupling members so as to impart thereto corresponding angular movement, and means for applying a predetermined primary feed to said grinding wheel, whereby when a grinding wheel having a diameter different from a predetermined standard diameter is used, the position of said grinder shaft is corrected in accordance with the angular position of said worktable thus grinding a closed curved surface in said workpiece.

2. The profile modeling grinding apparatus according to claim 1 wherein said means for imparting said composite motion comprises an Oldam's coupler permitting rotational and translation movements in the same plane, said Oldam's coupler being interposed between a shaft driven by driving means and a shaft carrying said worktable, said master cam and said correction cam.

3. The profile modeling grinding apparatus according to claim 1 wherein said workpiece is the rotor housing of a rotary engine and said closed curved surface comprises a trochoidal curved surface.

4. The profile modeling grinding apparatus according to claim 1 wherein said means for applying the primary feed is connected to said intermediate post and said grinder shaft, and said supporting shaft and said correction shaft are parallel with each other and extend through said grinder head.

5. The profile modeling grinding apparatus according to claim 1 wherein said means for transmitting the angular movement of said press roller comprises a first disc including a follower operated by an arm which supports said press roller, a second disc connected to one of said fixed shafts, a third disc, a pair of parallel levers interconnecting said second and third discs, and a spline shaft interconnecting said first and third discs.

6. The profile modeling grinding apparatus according to claim 1 wherein said master cam comprises two discrete cams provided with symmetrical closed curved surfaces on the peripheries thereof and the two closed surfaces cooperate each other to define a closed trochoidal curved surface corresponding to the trochoidal curved surface to be formed in said workpiece.

7. The profile modeling grinding apparatus according to claim 1 wherein said grinder shaft and said grinding wheel are driven by an electric motor having a shaft in vertical alignment with said supporting shaft.

8. Apparatus for profile grinding a trochoidal curved surface comprising:
- a worktable for supporting a workpiece,
- means for rotating and translating said worktable in a predetermined plane,
- a shaft perpendicular to said plane for supporting a grinding wheel above said worktable,
- means for feeding said shaft in a predetermined direction,
- a pair of master rollers rotatably supported by the stationary portion of the apparatus at positions on both sides of a plane containing the axis of said shaft and extending in the direction of the feeding of said shaft,
- a pair of master cams movable in a fixed relation with said worktable and are provided with two closed curved surfaces on the peripheries thereof,
- means for rotating incrementally said worktable so that the worktable completes one complete revolution when said trochoidal curved surface has been ground, said two closed curved surfaces on said master cams cooperating to define a profile corresponding to said trochoidal curved surface to be ground,
- means for urging said two closed curved surfaces of said master cams against said two master rollers respectively,
- and wherein an Oldam's coupling is interposed between a drive shaft and a spindle carrying said worktable and said pair of master cams so as to permit said spindle to rotate and translate in the same plane,
- whereby the direction of movement of said worktable is controlled by the cooperation of said master cams and said master rollers so as to grind said workpiece by said grinding wheel.

* * * * *